United States Patent [19]

Tutaj

[11] Patent Number: 4,748,890
[45] Date of Patent: Jun. 7, 1988

[54] CHORD CONSTRUCTER

[76] Inventor: Raymond J. Tutaj, 5071 W. Pioneer, Apt. 202, Las Vegas, Nev. 89102

[21] Appl. No.: 44,650

[22] Filed: May 1, 1987

[51] Int. Cl.$^4$ .......................................... G09B 15/02
[52] U.S. Cl. .................................. 84/485 SR; 84/473
[58] Field of Search .................. 84/471 SR, 473, 474, 84/480, 485

[56] References Cited

U.S. PATENT DOCUMENTS

| | | | |
|---|---|---|---|
| 727,846 | 5/1903 | Sanford | 84/473 |
| 2,001,191 | 5/1935 | Golden | 84/485 SR |
| 3,758,698 | 9/1973 | Matyas | 84/485 SR |
| 4,289,057 | 9/1981 | Whitlock | 84/485 SR |

FOREIGN PATENT DOCUMENTS 1295768 11/1972 United Kingdom ........... 84/471 SR

*Primary Examiner*—Lawrence R. Franklin

[57] ABSTRACT

The invention pertains to musical teaching aid devices for fretted instruments such as guitar. The enclosed invention is a device in which the user builds a desired chord and is taught the form and the spelling of the chord by the use of a special embodiment which contains a perforated top piece plate in which strings and frets are represented by indica, and the bottom piece plate has indica on both sides. The top side containing indica representing the names of the musical notes which are viewed through the top perforated piece, and the back side of the bottom piece contains the chord spelling of a plurality of chord types. In between both the top and bottom piece plates is a frame, which fastens the top and bottom together and serves the purposes of allowing slides to pass through the six given spaces (inserts) in the frame. One slide is given for each string, in which one perforation is centered in the middle of the slide to allow for the selection of a desired note when pushed or pulled through the embodiment. Therefore allowing any type or form of chord to be constructed.

3 Claims, 4 Drawing Sheets

CHORD CONSTRUCTER

BACKGROUND OF THE INVENTION

The study and understanding of chords in music is essential for the student and/or musician to be successful. A knowledge of the many types of chords and their relation to one another is also essential for creativity. Many musical books contain a vast array of chords and their theory to help. Very few devices are available and the ones that are available are cumbersome, complex, or unclear. The prior art has shown me that there is not a device this simple and small, easy to use and compact with the capability to construct any form or type of chord in music and without the addition of any added pieces. Needed is a better method that makes a stronger impact on the mind of the student in which learning is quicker and enjoyable. Books must be looked into again and again to absorb everything contained within the black and white pages. However a chord device, such as the enclosed invention, has the ability to make a stronger impression if done in a clear simple manner, but this has been the problem of the prior art. However the enclosed invention is believed to have overcome the shortcomings of the prior art.

SUMMARY OF THE INVENTION

The enclosed invention is a simple, handheld, unique and easy to use device for studying musical chords for guitar-like instruments. It is one embodiment and no attachments are to be added. It is compact and small enough to be put in the center of the book or in a guitar case. The device is used to study the chords in music. With this device chords may be constructed by moving each individual slide for each string to any desired fret area. Thus making it possible to construct any type or form of chord. The notes of the chord are revealed through a perforated fingerboard piece (top plate of embodiment) in which the slides, each containing one perforation in center, can be pushed or pulled to any fret area, revealing any note, which is printed with indicia on bottom plate of embodiment, thus by combining the number of slides needed to desired position, the desired chord is formed and may be fingered as such.

The main objects of the invention are: To provide a device in which the chord forms and spellings may be learned with ease and to make much more of an impact on the memory bank of the student by actually visualizing the formation of the chords. To provide a device which eases the understanding of movable chords, in which the student learns a form of any chord and realizes it is movable up the neck of the guitar which increases the understanding of the instrument greatly.

The material of the device can be made of a preferable plastic or a card stock type paper.

BRIEF DESCRIPTION OF THE DRAWING

The above mentioned invention and its other features will become more clearly understood on examination of the following description which also contains a set of drawings in which reference characters refer to the different parts of the invention.

FIG. 1 shows the front face view of the invention 1 which is illustrating the musical chord F Major. The note names 8 of the chord are located on the note name chart 12 which is located under the note selector slides 2. The chord is built by moving the note selector slides 2 to the proper position where the notes are located.

FIG. 2 shows a front face view of the chord constructor 1 without the fret position board 3 in place. The frame 9 is seen in this view also with the note name chart 12, however the note names are covered by the note selector slides 2 except those notes viewed through the single perforation 11 located in the center of the note selector slide 2. The note selector slides 2 pass through the frame 9 which can be easily viewed in FIG. 9. The fret position board fastener 10 is for the purpose of fastening, with an adhesive, the fret position board 3 which is placed on the frame 9, in which an adhesive is recommended for fastening.

FIG. 3 is a face view of the fret position board 3 which contains a plurality of perforations 4 in which note names 8 may be viewed. It contains indicia representing frets 6 and strings 7. The area or position in which the fingers are to be pressed is indicated by the fret area indicator 14.

FIG. 4 is a face view of the note name chart 12 in which all the notes 8 of a six to eight fret span area are given. Indicia is also given in which it represents or displays the frets 6 and strings 7. The note selector slides 2 slide over the note name chart 12 selecting desired notes 8. The fret position board fasteners 10 also can be seen in this view in which the fret position board 3 is fastened by an adhesive. FIG. 5 is a view of the reverse side of the note name chart 12 in which chord types 13 are given along with their spelling 16 for reference. FIG. 6 shows a side view of the note name chart 12.

FIG. 7 shows a front face view of a note selector slide 2 in which it contains a perforation 11 for the viewing of notes 8 on the note name chart 12. Also in view are two slide stops 5 located at opposite ends of the note selector slide 2 which are used to prevent the slides 2 from slipping completely through the slide insert 15 and it is also used for the fingers to grasp the slide easily to push or pull it in the desired position. FIG. 8 shows a side view of the note selector slide 2 pictured in FIG. 7. FIG. 9 shows a front view of the frame 9 which sets on the outer edges of the note name chart 12. Located within the opposite ends of the frame 9 are slide inserts 15 for the note selector slides to pass through.

FIG. 10 shows a side view of the frame 9 in which a note selector slide 2 is seen passing through a slide insert 15.

Figure 1:
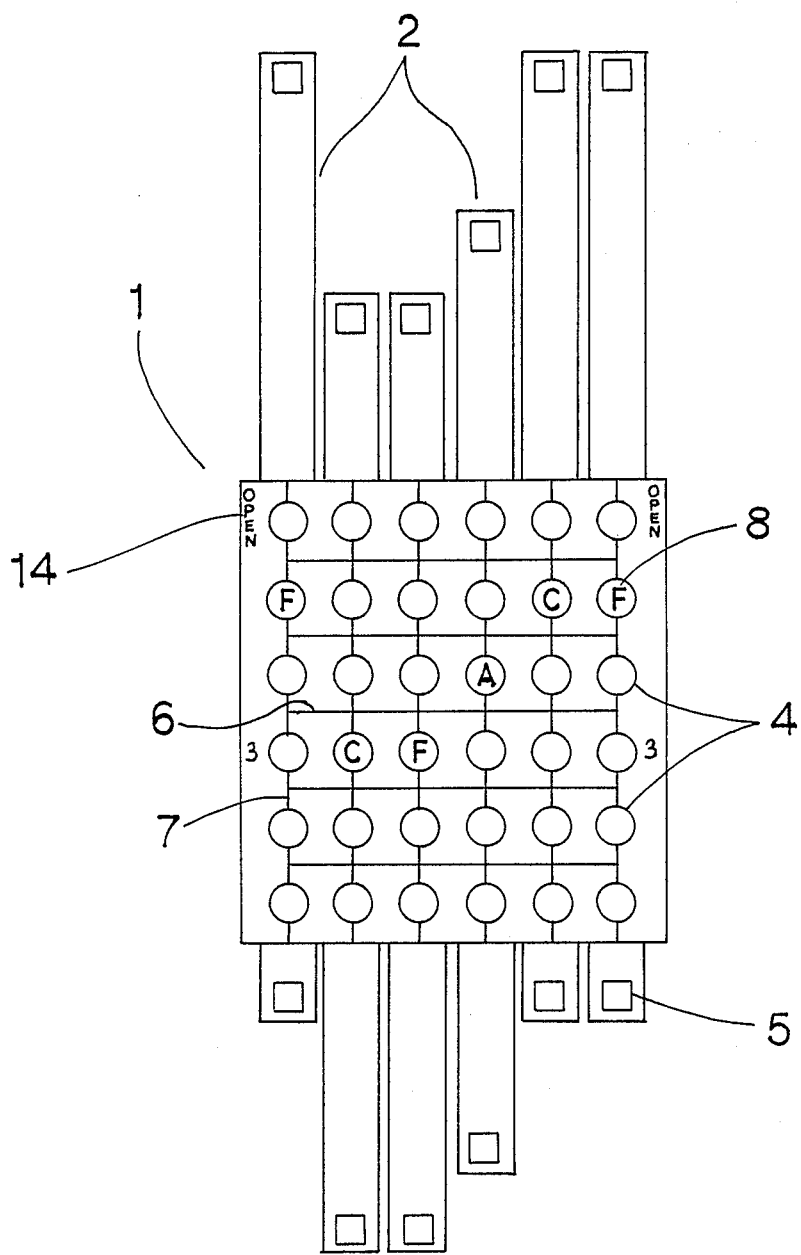
FIG. 1 Shows the front face view of the invention
Figure 2:
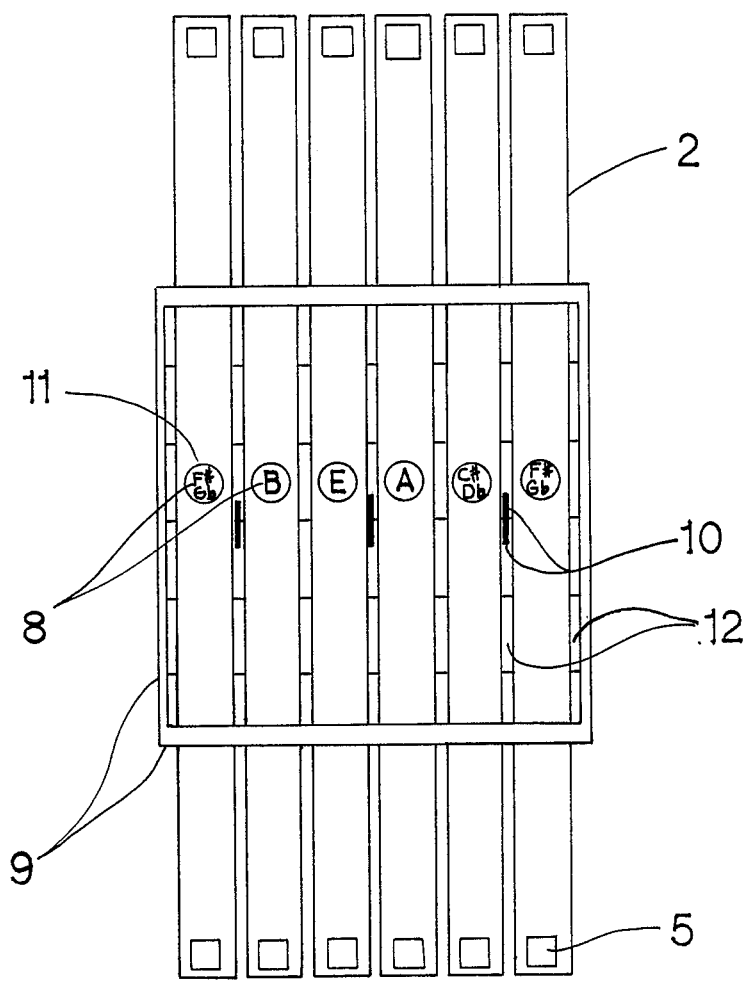
FIG. 2 Shows a front face view of the chord constructor invention without the fret position board.
Figure 3:
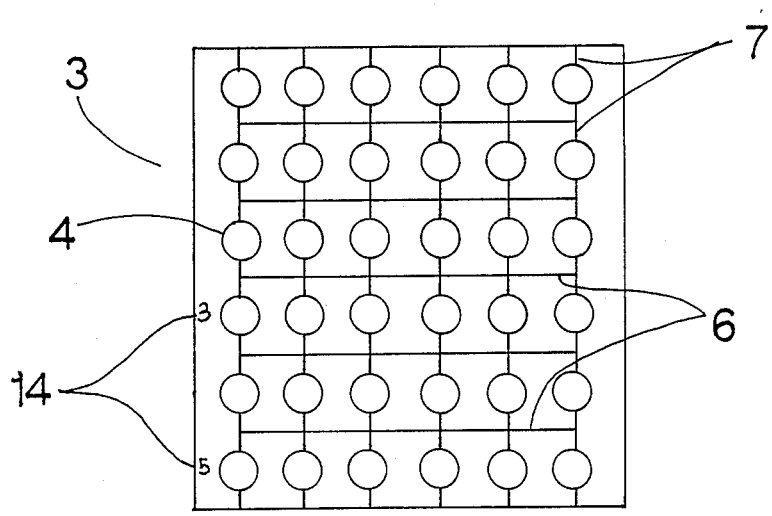
FIG. 3 Shows a front face view of the fret position board.
Figure 4:
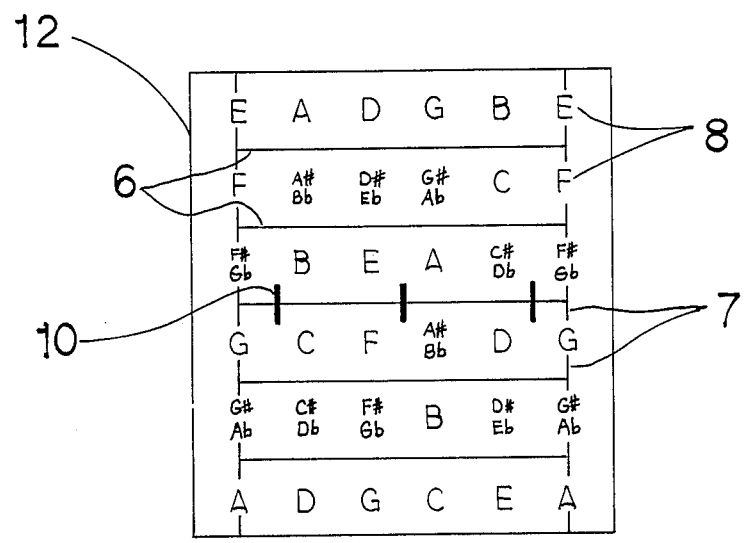
FIG. 4 Reveals a face view of the note name chart.
Figure 5:
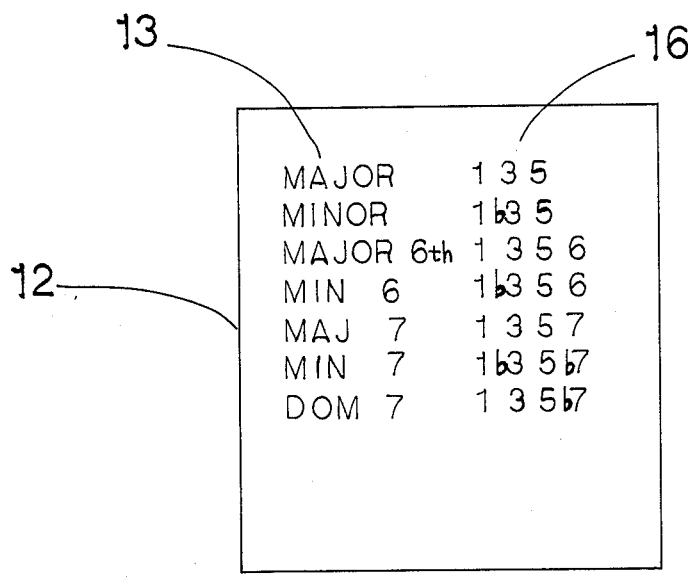
FIG. 5 Shows a view of the reverse side of the note name chart.
Figure 6:
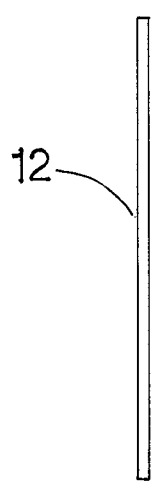
FIG. 6 Shows the side view of the note name chart.
Figure 9:
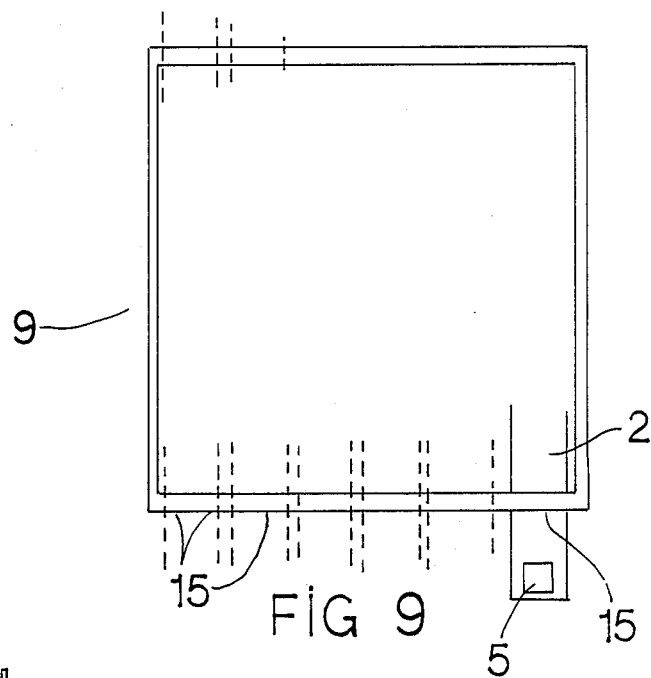
FIG. 9 Shows a front face view of the frame.
Figures 7, 8:
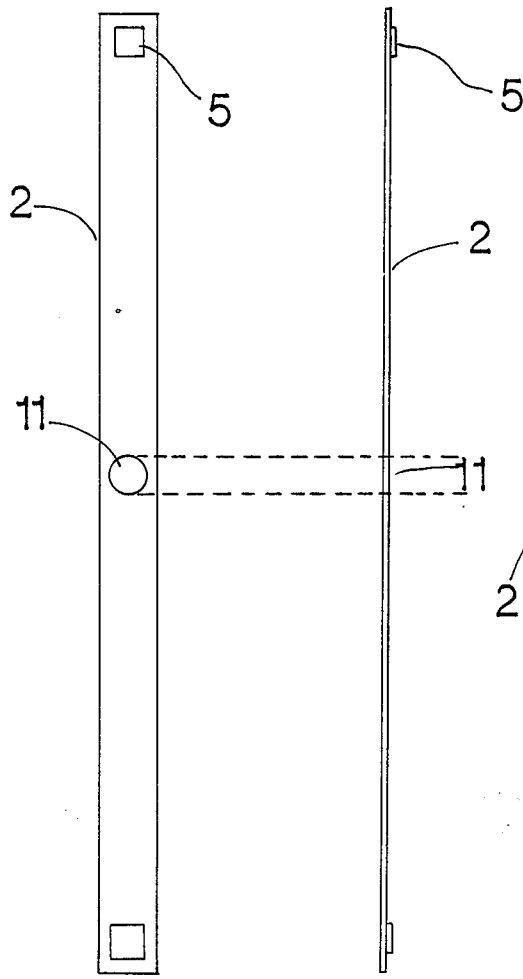
FIG. 7 Shows a front face view of a note selector slide.
FIG. 8 Shows the side view of a note selector slide.
Figure 10:
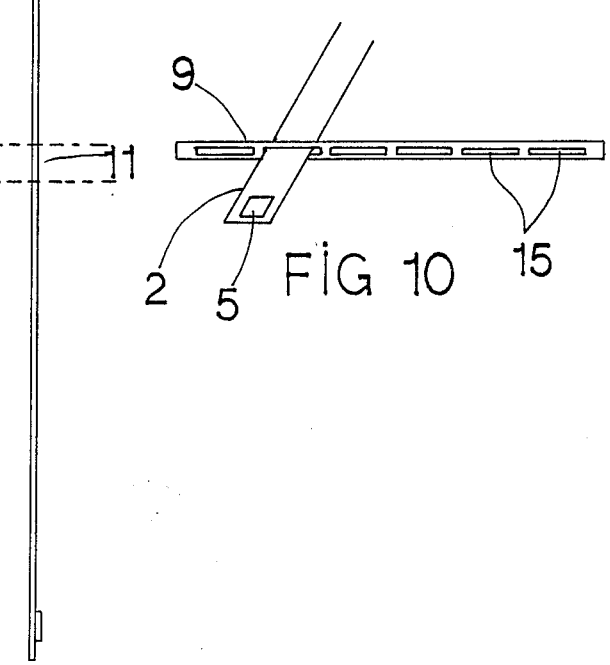
FIG. 10 Shows the side end view of the frame.

What is claimed and desired to be protected by U.S. Letters Patent is:

1. A slide rule teaching aid for guitar-like instruments, comprising;
    a bottom plate, said bottom plate having indicia printed thereon comprising an array of note names representing the fingering locations on a fingerboard associated with the note names for said instruments;

a top plate, said top plate having perforations therethrough aligned with said note names on said bottom plate, whereby said note names may be viewed through said perforations, said top plate further including string and fret indicia simulating said fingerboard;

a frame holding said top and bottom plates together, said frame containing a pair of openings aligned with each string indicia; and a plurality of slides, each slide being movable within one of said pair of openings, and each slide having one perforation to display a selected note name on a selected string indicium, whereby each slide is aligned with a note name on said bottom plate, which note name is viewed through said slide perforation and the aligned top plate perforation.

2. A slide rule as in claim 1 wherein each of said plurality of slides includes stop means at opposite ends for prevention of said slides slipping out of said frame openings.

3. A slide rule as in claim 1 wherein said slide perforation is substantially centrally located in said slide.

* * * * *